United States Patent [19]

Hall, Jr.

[11] 4,351,025

[45] Sep. 21, 1982

[54] PARALLEL DIGITAL COMPUTER ARCHITECTURE

[76] Inventor: William B. Hall, Jr., 3817 Reinwood Dr., Dayton, Ohio 45414

[21] Appl. No.: 304,125

[22] Filed: Sep. 21, 1981

Related U.S. Application Data

[63] Continuation of Ser. No. 55,424, Jul. 6, 1979, abandoned.

[51] Int. Cl.³ .............................................. G06F 9/16
[52] U.S. Cl. .................................... 364/200; 364/133
[58] Field of Search ............... 364/200, 900, 131, 133, 364/137, 145

[56] References Cited

U.S. PATENT DOCUMENTS

| | | | |
|---|---|---|---|
| 3,349,375 | 10/1967 | Seeber et al. | 364/200 |
| 3,363,234 | 1/1968 | Erickson et al. | 364/200 |
| 3,533,076 | 10/1970 | Perkins et al. | 364/200 |
| 4,065,808 | 12/1977 | Schomberg et al. | 364/200 |
| 4,104,720 | 8/1978 | Gruner | 364/200 |
| 4,128,880 | 12/1978 | Gray, Jr. | 364/200 |

*Primary Examiner*—James D. Thomas
*Assistant Examiner*—David Y. Eng
*Attorney, Agent, or Firm*—Donald J. Singer; Bernard E. Franz

[57] ABSTRACT

A parallel digital computer with which real-time simulations can be performed. A multiplicity of elemental computers are joined in a parallel architecture through a master computer and shared memory system. Real-time operation of the elemental computers and master computer are time interleaved without overlap. Input data entering each elemental computer is processed according to the designated function during one time segment, succeeded by a master computer operating time segment during which the resultant elemental computer data is selectively transferred to the appropriate elemental computers for the next processing sequence. A real-time clock synchronizes the alternating time segments, allocating sufficient time for the processing performed by the elemental computer and the subsequent data transfer steps. Integration, unlike addition, subtraction and the numerous other arithmetic and logic functions, is performed only once per frame time. To maintain simulation accuracy, the frame time is defined to be short in comparison to the period of the highest frequency present in the real-time simulation. On the other hand, the frame time must be sufficiently long to satisfy the time demands of the intra-frame time cycling between elemental and master computers which is bounded by the elemental computer processing rate and the number of non-integrator elemental computer functions between successive elemental computers operating as integrators.

12 Claims, 6 Drawing Figures

PARALLEL DIGITAL COMPUTER ARCHITECTURE

RIGHTS OF THE GOVERNMENT

The invention described herein may be manufactured and used by or for the Government of the United States for all governmental purposes without the payment of any royalty.

CROSS REFERENCE TO RELATED APPLICATION

This is a continuation of my application Ser. No. 06,055,424 filed July 6, 1979, now abandoned.

BACKGROUND OF THE INVENTION

This invention relates to a parallel digital computer architecture and more particularly, to a computer for performing programs digitally but in the format of an analog computer.

Analog and hybrid computers have been the traditional tools for performing real-time simulations of body or structural dynamics. Nevertheless, many attributes of the digital computer make it an appealing substitute for the analog or hybrid forms, when the capabilities of the digital computer and the nature of simulation admit. The fundamental deficiency of the conventional digital computer architecture, in the performance of time related simulations, resides in the cycle time. Since time dependent simulations in such digital computers require repeated looping or cycling through the program, the highest simulation frequency attainable is severely constrained by both the complexity of the simulation and the cycle time of the digital computer. Furthermore, it is nearly impossible to overcome this deficiency by dividing a single real-time problem into subprograms of controlled computation time, because the variable interval integration algorithms used vary in processing time from cycle to cycle. Thus, it may generally be said that the art of real-time simulation in conventional architecture digital computer systems will be severely limited by the cycle speed of available and foreseeable digital computers. On the other hand, complex simulations at other than real-time can be divided into smaller elements to reduce the running time of conventional digital computers. One such approach is taught in U.S. Pat. No. 3,346,851 issued to J. E. Thornton et al.

BRIEF SUMMARY

The present invention is directed to an architecture for digital computers, by which architecture the computers are structurally oganized and time synchronized to undertake real-time simulations of the type previously attainable only with analog or hybrid computers. In one form, the structural organizations consists of a master computer (MC), a MC memory, a multiplicity of elemental computers (ECs), and a real-time clock (RTC) synchronizing in alternating fashion the EC operations and MC data transfer through an interconnecting net of data and address buses.

Each of the multiple ECs performs a logic or arithmetic function, being best characterized as individual microprocessors. The MC, typifying a conventional scientific minicomputer, when actuated by the RTC while in the RUN mode, controls data transfer among all the functional elements, performs logic and arithmetic operations, and if called upon, performs the function of layout organization or conventional compiling of the input program. Both the ECs and the MC communicate with the MC memory to store, retrieve, and selectively transfer data moving within the parallel digital computer (PDC).

The real-time clock alternately actuates the ECs as a group then the MC individually. Thereby data is sequentially processed, for instance, by having the MC take the results from the immediately preceeding EC run sequence and selectively transfer that data among the memory and EC elements in preparation for the next EC sequence. The cycling between the MC and ECs is performed at a rate significantly greater than the highest frequency present in the simultation being performed, so that the accuracy of the digital integration is not degraded. Whenever individual ECs ar actuated by the RTC, they undertake their designated functions at a rate set by an independent, cycle clock having a frequency orders of magnitude greater than the system RTC itself.

DETAILED DESCRIPTION

Figure 1:
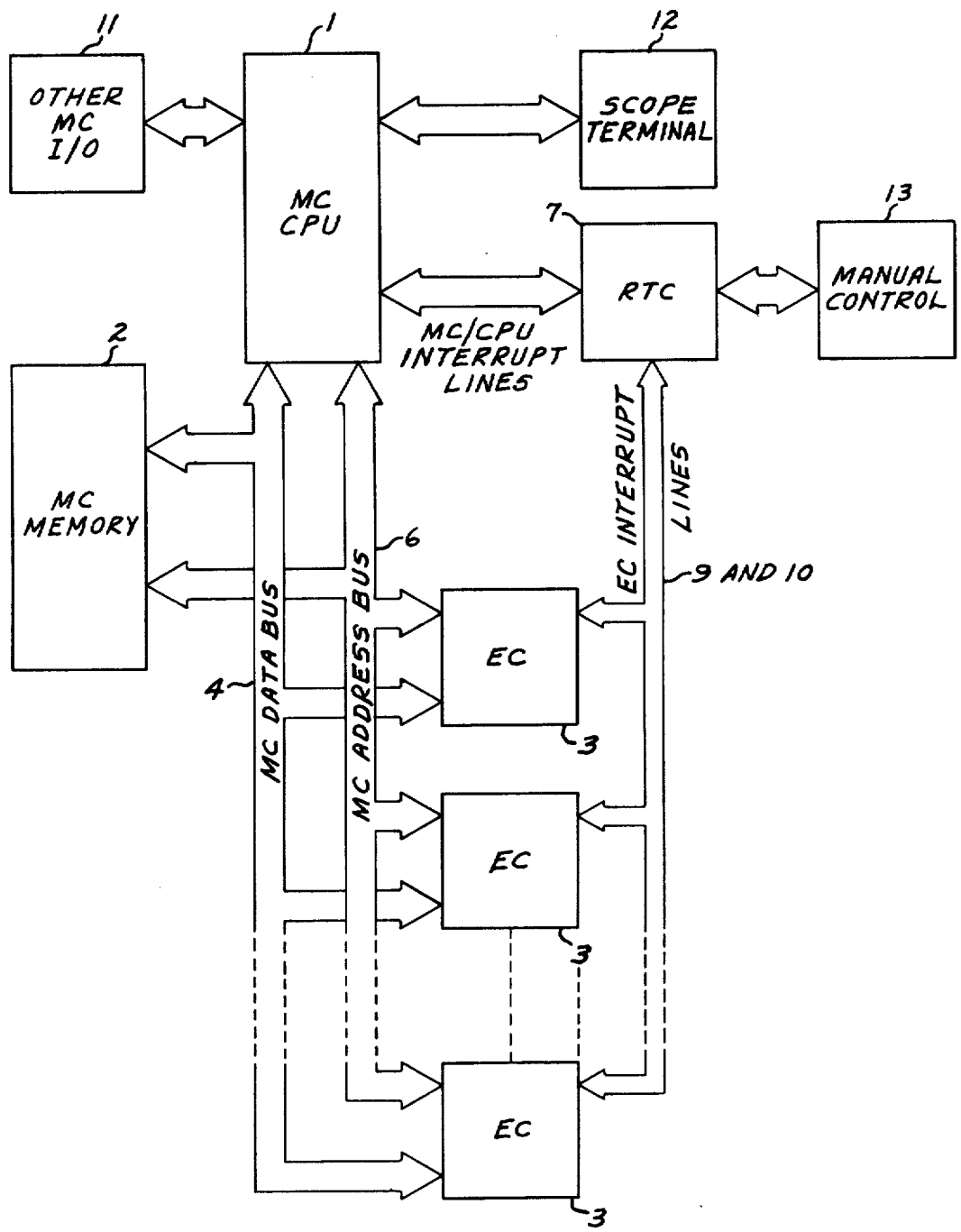
FIG. 1 is a schematic block diagram of the parallel digital computer (PDC) as a complete system.

The parallel digital computer (PDC) architecture disclosed herein overcomes the inherent deficiencies of conventional digital computers by defining an architecture which permits concurrent, parallel operations to undertake real-time simulations. Broadly stated, the PDC architecture includes a plurality of elemental computers (ECs), typified by a state-of-the-art microprocessor, interconnected through a master computer (MC) and its memory, and synchronized to a real-time clock (RTC). This general structure appears in the schematic block diagram of FIG. 1. As shown, master computer central processing unit (MC CPU) 1, MC memory 2 and multiple ECs 3 communicate by means of data bus 4 and address bus 6. The actual distribution of data registers between MC memory 2 and the individual ECs can be lumped in the MC memory or distributed among the ECs; in either case they are treated as being shared. Real-time clock 7, present in the figure, synchronizes the operations of MC CPU 1 and ECs 3 with interrupt signal transmissions on interrupt lines 8, 9 and 10. Master computer input/output (MC I/O) unit 11 and scope terminal 12 are conventional. The remaining element, manual control 13, will be specifically described hereinafter.

The schematic block by which the PDC structure and operation are described herein are functionally labeled. Nevertheless, these blocks represent actual apparatus cognizable by those practicing in the data processing arts. The timing diagrams appearing in FIG. 4 do not represent actual electrical waveforms, but rather, are presented to show the time related interplay among the functional blocks in a qualitative sense. Actuation of the interrupts is defined as occurring coincident with the waveform transition from a low to a high level.

Figure 3:
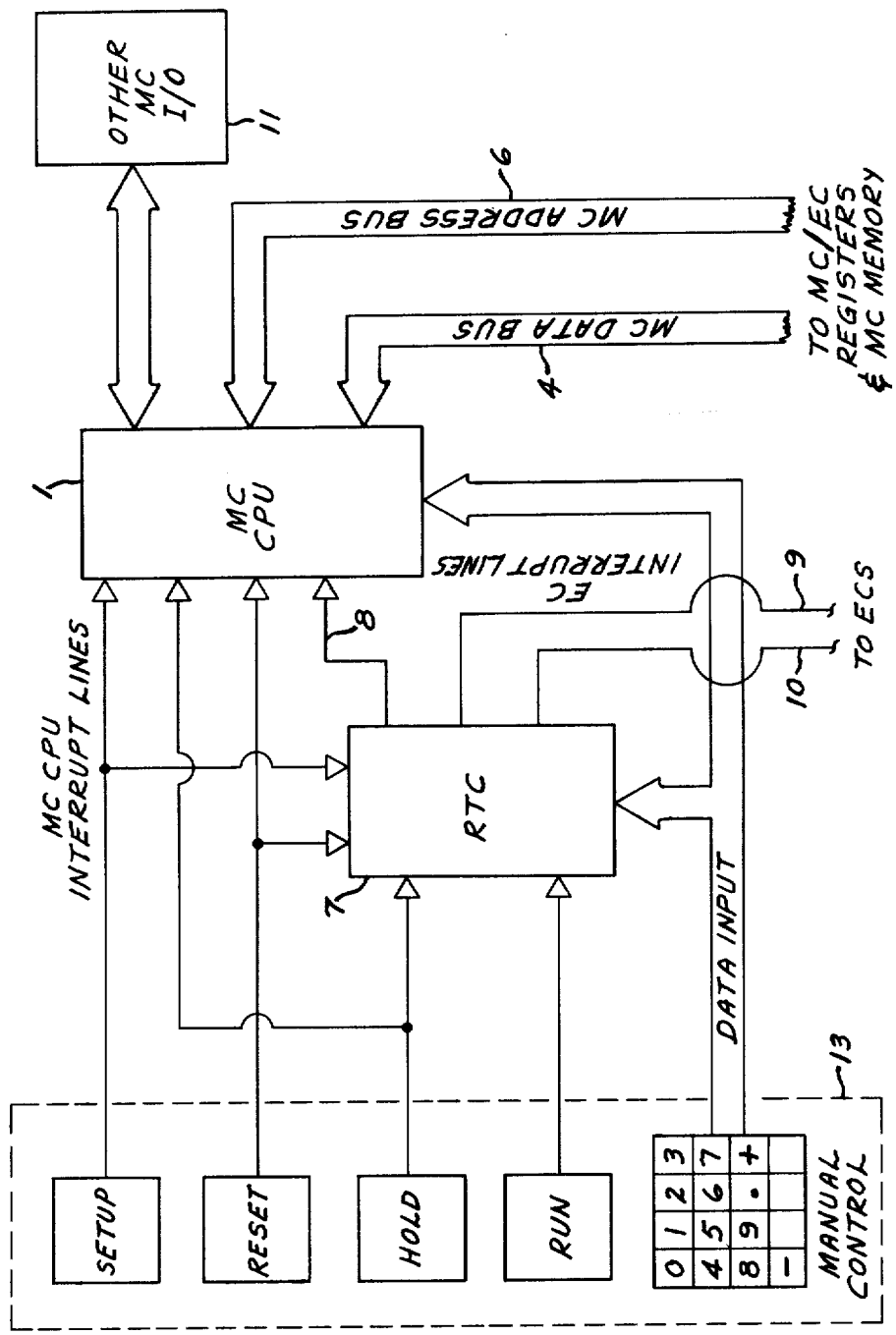
FIG. 3 is a schematic diagram depicting the various operator control functions available with an embodiment of the PDC.

The MC, as a whole, appearing in FIGS. 1 and 3 is broadly catagorized as a general purpose scientific digital minicomputer having individual identifiable CPU, I/O and memory elements. It does differ in one minor respect. Namely, the upper portion of the memory addresses, possibly 64,000 words, are reserved for communication with the ECs. These registers are, nevertheless, still accessible to the MC CPU in the normal manner. In one version of the MC, it is further contemplated that the MC have the capacity to compile software as an adjunct to its PDC control functions.

Figure 2:
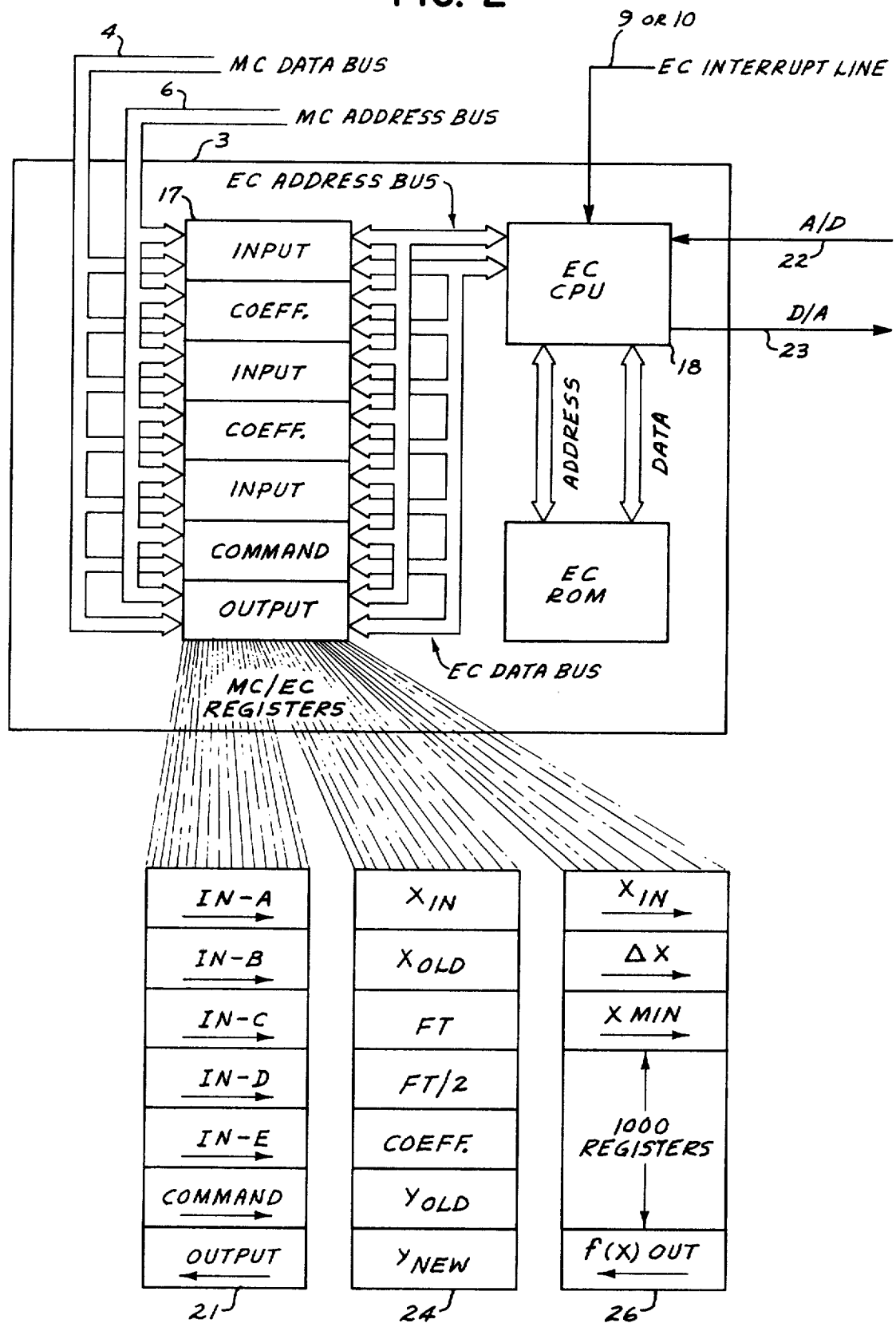
FIG. 2 schematically shows the functional block structure of an elemental computer EC and contemplated variations of the registers.

The ECs, 3, are primarily arithmetic processing units (APUs) with external interrupt capacity and various I/O registers. A simple APU would have a minimum of two input registers, one output register and a command register. Normally they are significantly more complex, as shown by FIG. 2. Upon receiving the appropriate interrupt signal from EC interrupt line 9 or 10, the EC makes one pass of the selected program using the input register data, storing the results in the output registers. The program executed can either be one from a library of stored firmware programs, selected by the MC, or, in a more exotic option, a program introduced by the MC for that particular pass. The pass internal to the EC is synchronized to a separate, high frequency clock operating at a rate commensurate with the command being executed. As contemplated the EC I/O register data is floating point format, though other data, such as program selection commands, can be adequately handled with simple integers.

The above-noted EC registers, in one form, are physically located with the individual ECs, for instance on the EC chip, but continue to have MC addresses and access through the MC data bus concurrent with the EC access.

The RTC, as the name implies, is the pace setting element for running the real-time simulation. It may generally be said that the RTC operates at a fixed rate commensurate with the upper frequencies of the simulation, the execution times of the EC programs, and the largest number of non-integrating EC stages between consecutive ECs functioning as integrators. Each aspect will be considered in turn at a later point.

Figure 4:
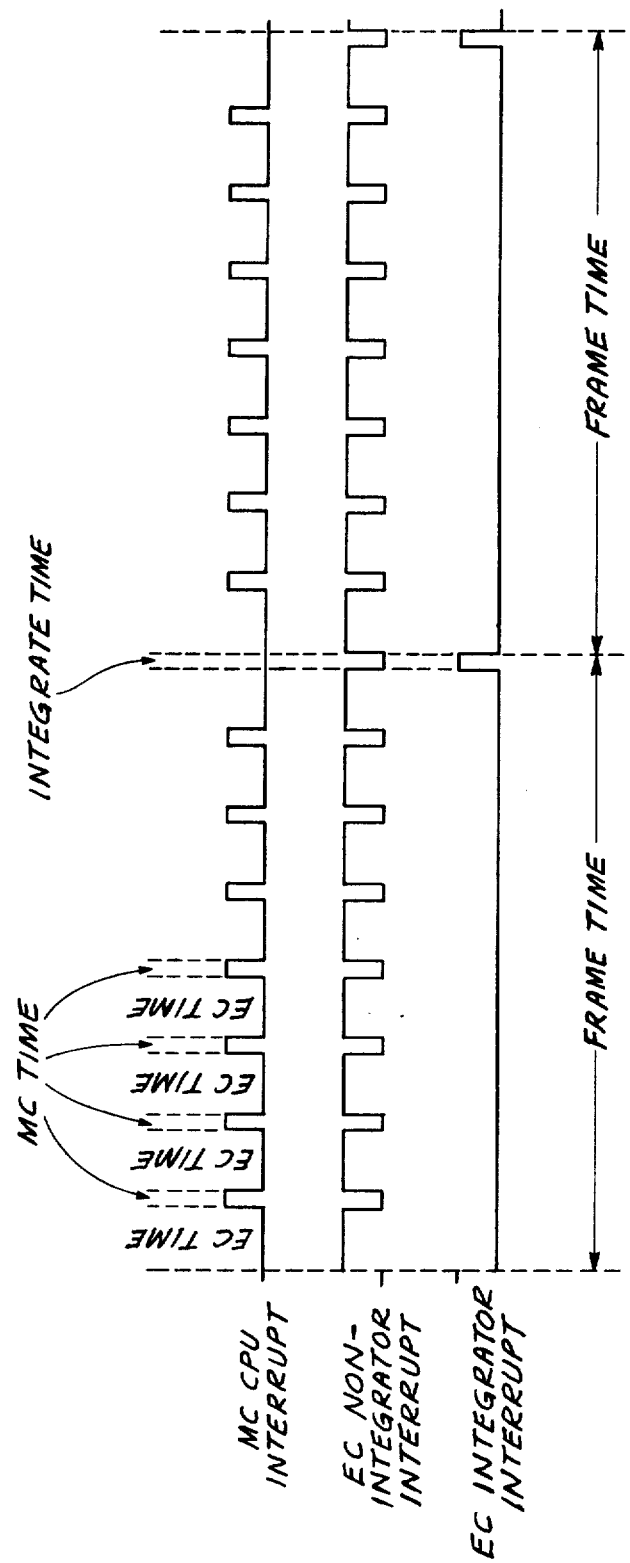
FIG. 4 schematically depicts the timing sequence of the real-time clock (RTC).

The frame time (FT), as depicted on the plots in FIG. 4, defines the time interval between integration updates. Recognizing that the updates should preferably occur at a rate of no less than 10 times the highest frequency in the simulation, the nature of the simulation thereby fixes the maximum duration of the FT. As an example, if the simulation is that of an aircraft with responses up to 20 Hz, a FT of 5 msec. would permit integration updates at a rate 10 times greater, i.e., 200 Hz.

The minimum FT, on the other hand, is primarily a tradeoff between the number and duration of the EC time segments in each FT. The FT in FIG. 4 contains eight such EC time segments with the remainder allocated to the MC and interrupt delays. As will become apparent from the example hereinafter, the major time consumers in each FT are the EC segments.

On one side of the balance is minimum time that can be allocated to each EC segment, this being bound by the EC function requiring the longest execution time. For instance, in one commercial microprocessor the power function ($Y^X$) requires an execution time more than 55 times greater than the simple multiplication of $X \times Y$.

The other side of the balance allocating FT is the simulation layout, or stated otherwise, the distribution of functions among the ECs. The PDC architecture disclosed herein requires sequential processing and transfer of data from EC to EC, with the MC CPU designating the ECs to operation and the path of the data transfer. Since each EC must, in turn during its time segment, act upon the data processed by the previous EC during the previous EC time segment, and all intermediate EC processed data must be available to the integrator EC each FT, the maximum number of series connected non-integrator ECs between successive in series integrator ECs is one less than the number of EC time segments in each FT. Again referring to FIG. 4, the maximum number of non-integrator ECs between series integrator ECs is seven. In view of the above, it is evident that the slower simulations, or ECs with faster execution time, provide more interconnection flexibility for the simulation programmer.

The RTC, when running, generates three channels of output signals carried by lines 8, 9 and 10. The first line, 8, goes to an interrupt on MC CPU 1. The second line, 9, is directed to the ECs as an integrator interrupt. The last line, 10, is the EC non-integrator interrupt. As evident in FIG. 4, the MC CPU and non-integrator interrupt time intervals are complementary in nature, i.e., there is no overlap of MC CPU and EC non-integrator operations. Each of these two time intervals is independently adjustable, and the sum of the two substantially equals the FT of the PDC system.

As shown in FIG. 3, direct operator control over the RTC, with data entry access to the MC, is provided by manual control 13. Such external control is analogous to the operator panel of analog computers. As contemplated, the simulation and RTC do not commence operation until after a software compiler, which also runs on the MC, selects and stores the proper commands in each EC command register, and generates the data transfer or interconnect program to be run on the MC.

To adequately address the PDC architecture in a logical manner it is necessary to introduce optional design considerations, which to a substantial degree are cost effectiveness related.

The first of these design options is to load programs into the ECs from the MC, as opposed to having the entire EC library stored on each EC for future selection. This would be done during the PDC compilation and would replace the EC command mode selection introduced previously. A savings would be realized in terms of the memory required for each EC while also eliminating the need for a command register in either the EC or MC memory. On the negative side, compilation time would be increased somewhat. The second optional design feature offers tremendous potential for the MC I/O; the option being an inclusion of the I/O function in some or all of the ECs. Thereby, the EC output could appear continuously to the user, though it would require that each EC library monitored have an output program included. Outputs could be digital, with various formats, or D to A converted to permit direct attachments of actual hardware during simulation. A to D input data access into individual ECs is a corollary refinement. Design option number three, the capability to multiply each input by a constant, results in the savings of many ECs when a complete simulation program is considered. The feature would allow the PDC compiler to load a constant at compilation time, which would multiply the result of the chosen program each EC time. If not needed, the PDC compiler would insert a value of one for the constant. Experienced analog programmers can appreciate the savings in ECs as it would be analogous to saving an EC for each potentiometer in an analog simulation circuit. The fourth and last design option presented here is the inclusion of more than two input registers for some or all of the ECs, perhaps six inputs as shown in FIG. 2. This would result in a savings of ECs, particularly those performing summation and multiplication functions. This does, nevertheless, complicate the PDC compiler somewhat, so the tradeoffs have to be considered in detail before implementing the technique into a PDC architecture.

Sizing the PDC, i.e., determining the number of ECs for such a computing system, is directly dependent upon the complexity of the simulation. For purposes of illustration, a representative count of functional elements in several six-degree-of-freedom analog simulation problems gave an average of 500 active components plus 300 potentiometers. If design option number three is employed, then 500 ECs is a good estimate for the minimum number and 1000 is a good maximum. Since it is assumed with this option that any of the EC library programs can be run on any EC, then the largest library program dictates the memory size of the ECs. In further refinement, if design option number one is also employed, a good estimate is 4,096 words, with a maximum of 8,192 words for EC memory.

The amount of memory needed for the MC is dictated by both the complexity of the simulation and the extent of compilation necessary to implement the EC controls. Intuitively, 128K of 32 bit words appears desirable in the case of the six-degree-of-freedom simulation problems. In any case, the MC special memory requirements are directly dependent upon the number of ECs used and the design option selected, particularly as to either one or four.

Until now, "words" as PDC computer elements have been mentioned, but word size has not been addressed as a design consideration. Based on analog accuracy, and fixed point arithmetic, 16 bit words for both the ECs and MC would appear to suffice. However, in the interest of eliminating scaling of variables floating point numbers are desired. This means that 24 bits for the fraction and 8 bits for the sign and characteristic are a logical choice since the word size most commonly used in computers today is 32 bits, the next word size larger than 16 bits.

As was suggested previously, the PDC should be fabricated as an integrated, hardware compatible device. The logical approach to accomplish this is to first choose a master computer and then design and fabricate the ECs using the same technology. In the interest of speed, the MC data bus should be 32 bits wide. All arguments, parameters, data, etc., should be 32 bit floating point numbers to maintain resolution and eliminate scaling of variables. Of course, the MC and ECs should employ the same floating point format. The EC/MC registers located on the ECs, see FIG. 2, should be non-volatile with respect to the EC. Namely, input arguments to the EC should not be destroyed by output arguments from the EC. Also, in the interest of speed, only one stage transfer in the EC/MC register is desirable.

Under the PDC structure described above, integration of a variable as a function of time is very straightforward. Since synchronous operation is the modus operandi, the PDC FT is related directly to the integration time interval and the integration algorithm becomes minimal. For example, it is known in the art that three terms of the Taylor series expansion is a viable algorithm.

In addition to the normal software for the MC, two special software items are needed, a PDC compiler and the individual program software for the EC library. The PDC compiler provides a means for translating a program written in a high level language, for instance a subset of Fortran with some special functions added, into the setup and initialization of the PDC. The machine language program generated controls the MC during the running of the simulation. Table 1 lists the principle functions of the PDC compiler as presently contemplated.

TABLE I

Equation Cracking
Reduce complex equations into a number of equations or expressions of simple form involving two variables and one arithmetic operator. The objective is to divide the expressions so that each resultant expression can be assigned to a single EC.
Bookeeping to allocate expressions to individual ECs.
Selecting the commands to designate the operating modes of each EC.
The commands are determined by the arithmetic operator in the simple form expression.
Generating the MC RT program.
The primary function of this program is to prescribe the transfer route by which data is routed from the output registers of each EC to the correct input registers of other ECs. This is similar in function to the patchboard wiring of an analog computer.
Generating a list of variables represented by the EC.

The individual software functions forming the EC library are foreseen to include any single or combination of the functions listed in Table 2 below.

TABLE 2

| Arithmetic Expressions | Functions |
|---|---|
| addition | All Fortran IV single Pre- |
| subtraction | cision non-complex func- |
| multiplication | tions |
| division | Integration |
| exponentiation | fixed interval |
|  | Table Lookup |
| Logical Expressions | one independent variable |
| not |  |
| and |  |
| or |  |
| exclusive or |  |
| Relational Expressions |  |
| less than |  |
| greater than |  |
| equal to |  |
| not equal to |  |

Actual operation of the PDC can be divided into three fairly distinct phases: program loading, program setup and initialization, and running the RT simulation program. During the loading phase, the high level language program is translated by the PDC compiler to allocate ECs, designate their operating commands, and generate a machine language program for controlling the MC during the running of the simulation program. Phase two, setup and initialization, consists of selecting and setting starting values for the program variables, inserting data for table lookups, and selecting FT parameters. It is desirable from an operator's viewpoint to be able to perform these functions via scope terminal 12.

Each EC register 17, shown in FIG. 2, has a unique MC address accessible via buses 4 and 6 in addition to access from EC CPU 18. Generally, all registers but those labeled OUTPUT can be written by the MC and read by the corresponding EC. The OUTPUT registers can be written by the EC and read by the MC.

Table 3 provides a functional description of the activities caused by actuating the various settings in manual control 13. It is worth noting that most are analogous to contemporary analog computer operating modes in reasoning and sequence.

TABLE 3

| CONTROL MODE | | FUNCTIONAL DESCRIPTION |
|---|---|---|
| SETUP | STOPS | INTERRUPTS MC PROGRAM SO THAT IT WILL ACCEPT |
| | RTC | DATA AND PARAMETER CHANGES |
| RESET | STOPS | INTERRUPTS MC PROGRAM SO THAT IT LOADS DATA IN |
| | RTC | PROPER MC/EC REGISTERS |
| RUN | STARTS RTC | RUNS MC TRANSFER PROGRAM, EC COMMAND |
| | RTC | PROGRAMS, AND INTEGRATOR EC PROGRAMS IN PROPER SEQUENCE |
| HOLD | STOPS | INTERRUPTS MC PROGRAM SO THAT IT WILL ACCEPT ADDRESS |
| | RTC | SELECTIONS TO MONITOR EC OUTPUTS. |

For the master computer the priority, high to low, is:
SETUP (Initialization)
RESET
HOLD
RUN.

This means that SETUP mode can interrupt RESET, HOLD and RUN before their programs are completed; repeating in succession as to the remaining modes. Note also, if a MC program is interrupted, the interrupt system does not cause execution of the remaining program at a later time. These interrupt signals are routed internally to the EC in accordance with the specific firmware program designated by the data in the COMMAND register.

Actual operation of the PDC commences after the SETUP mode has been fully executed by entry and compilation of the real-time simulation program. Upon actuation of the RUN mode, EC programs in the read only memory (ROM) of each EC, as selected by their COMMAND registers, are executed upon the appropriate interrupt signal from the RTC. During the MC segment of the RTC, data is transferred from the EC output registers to the appropriate EC INPUT registers, being substantially analogous to the interconnects on analog computer patchboards. Though this operation is performed sequentially, it is one of the faster of digital computer operations. All ECs, except the integrators, execute their programs simultaneously or in parallel upon receipt of the interrupt signal, repeating as depicted in FIG. 4 over the duration of the FT. At the end of each FT all integrator ECs are updated in parallel, following which the RTC commences a new FT. The process repeats cyclically as long as a higher priority interrupt is not initiated from the manual control 13. Changes in mode conform to the selection outlined in Table 3.

To better illustrate the method by which a PDC structure is defined, consider the following illustrative example. In this case the simulation to be performed is that of a six-degree-of-freedom aircraft or missile. Table 4 outlines the elements needed.

TABLE 4

| Type of EC | Number of ECs | Number of MC/EC Registers | Required Addresses |
|---|---|---|---|
| General purpose (GP) | 170 | 7 | 1,190 |
| GP with A/D | 60 | 7 | 420 |
| GP with D/A | 60 | 7 | 420 |
| Integrators | 150 | 7 | 1,050 |
| Function Generators | 60 | 1004 | 60,240 |
| | | TOTAL | 63,320 |

As suggested previously, the MC memory should contain 128 K of addressable 32 bit words. From Table 4 it is evident that 64 K of the memory need be reserved for MC/EC registers while the remaining 64 K is available as conventional memory.

In fairly conventional manner the timing signals would preferably begin with a master clock of high frequency, at the cycle rate of the MC and ECs, cycle counted to generate the RTC signals.

The geneal purpose ECs in Table 4 have register configuration 21 of FIG. 2 and perform the functional computation:

OUTPUT=f(A, B, C, D), where function f is the one from Table 5 which corresponds to the COMMAND register data. A, B, C, D and E are names given to the INPUTs. They can represent problem variables and change during RUN mode or represent constant coefficients, very similar to potentiometers in an analog circuit, that are prescribed during RESET mode and remain unchanged during RUN. If no multiplying is needed, or if only one input is desired, the coefficient is set to one or zero.

TABLE 5

| COMMAND | OUTPUT FUNCTION (FLOATING POINT) |
|---|---|
| ADD | $A \times B + C \times D$ |
| SUB | $A \times B - C \times D$ |
| MUL | $A \times B \times C \times D$ |
| DIV | $A \times B \div C \times D$ |
| SQRT | $[A \times B + C \times D]^{\frac{1}{2}}$ |
| SIN | $\sin[A \times B + C \times D]$ |
| COS | $\cos[A \times B + C \times D]$ |
| TAN | $\tan[A \times B + C \times D]$ |
| ASIN | $\arcsin[A \times B + C \times D]$ |
| ATAN | $\arctan[A \times B + C \times D]$ |
| LOG | $\log_{10}[A \times B + C \times D]$ |
| LN | $\log_e[A \times B + C \times D]$ |
| EXP | $e[A \times B + C \times D]$ |
| PWR | $[A \times B]^{(C \times D)}$ |
| ASW | larger $[A \times B]$ or $[C \times D]$ |
| LSW | $A \times B$ --------- $E > O$ |
| | $C \times D$ --------- $E < O$ |

If the EC is to accept analog data for one of the inputs, for instance D, it enters on line 22 in the analog state and is converted internally to the digital equivalent. The function expression for the ADD command is written as:

OUTPUT=A×B+C×AD.

Conversion of the output to analog is performed in a similar manner with the analog signal appearing on line 23.

The ECs functioning as integrators perform a calculation which approximates the analytic expression:

$$Y = \int_o^{FT} X dt.$$

The algorithm used is:

$$X_{new} = X_{in} \times COEFF$$

$$Y_{new} = FT \times Y_{old} + FT/2\{X_{new} - X_{old}\}.$$

$X_{in}$ is the data entering the EC integrator stage, while COEFF is a scaling multiplier analogous to an input potentiometer in an analog system. Together they provide added flexibility to each EC integrator. The parameters FT and FT/2, as well as the initial values of X and Y, enter their respective registers when the RESET mode is actuated. Initially, the registers are set such that:

$$Y_{old} = Y_{new} = Y_{initial}$$

$$X_{old} = X_{new} = X_{initial},$$

whereupon they are updated following the sequence:

$$X_{new} \rightarrow X_{old}$$

$$Y_{new} \rightarrow Y_{old}.$$

This transfer step means that after $X_{new}$ and $Y_{new}$ are calculated following the above algorithm, data $X_{new}$ and $Y_{new}$ are stored in registers $X_{old}$ and $Y_{old}$ for the succeeding FT calculation. The EC register configuration for integration is shown by reference numeral 24 in FIG. 2.

Single variable functions can also be readily accommodated in the PDC architecture. Like most computer circuit designs, speed and cost are prime factors that influence the end product, and this is no exception. It is well known that, if sufficient data is stored, no interpolation between data points is necessary. Obviously, this is a tradeoff between memory and computation time. Since the cost of random access memory (RAM) is low, the large storage alternative to single variable function generation is appealing. Based on experience, 1000 data points used to represent aerodynamic functions employed in aircraft or missile simulations would appear to allow storage of data sufficiently close to omit interpolation between data points. With such an approach, $X_{max}$, $X_{min}$ and the intermediate X value data are introduced into storage during the RESET mode. During the RUN mode values of the function, f(X), are determined by the data stored in registers. The registers are addressed by integers such as IX, here IX is the integer value for the floating point expression:

$$IX = (X_{in} - X_{min}) \times \Delta X, \text{ when}$$

$$\Delta X = \frac{X_{max} - X_{min}}{999}$$

As shown in reference numeral 26 FIG. 2, the data in the registers can be addressed by either the EC or the MC address buses, the latter being for the purpose of storing the data directly from the MC.

Implementing the PDC requires the consideration of three crucial operating constraints.

(1) Can the EC programs be completed in the time segments allocated by the RTC?

(2) Is there is a computational lag or error from one EC to another due to the hardware configuration?

(3) Is the overall computer speed sufficient for real-time simulation?

Although it is not shown explicitly in the figures depicting the block diagram of an EC, all APUs of such ECs have feedback signals indicating that the execution of the previously entered command is completed. These signals are used in a hardware check system to initiate an alarm if a RTC interrupt initiates a new command prior to the completion of previous commands by all ECs.

The possibility for computational lag, the second constraint, does exist based on the PDC architecture disclosed here. However, the provision for avoiding the lag is also inherent in the architecture and it would be the responsibility of the programmer to insure that it is avoided. A sophisticated PDC compiler can also be used to test for this possibility. The rule for avoiding computational lag due to data transfer between ECs, is to count the largest string of other ECs between any two successive integrator ECs within the program, and choose a cycle time which exceeds that count by at least one. It is anticipated that this count will seldom exceed ten, and based on the timing information which follows, will permit operation without error.

Timing estimates for the particular example under consideration are shown in Table 6, and indicate that no problem exists for the real-time simulation as it is defined here. Also, those practicing in the art recognize that improvements in speeds of microprocessor devices are literally forthcoming daily, so the estimates in Table 6 are comparatively conservative.

TABLE 6

Microprocessor cycle clock frequency is 10MHz
1 clock cycle = $10^{-7}$ seconds
Typical EC instruction (add, sub, mul, div) execution cycles
200 clock cycles or
$200 \times 10^{-7} = 2 \times 10^{-5}$ sec/instruction
Worst case EC instruction (POWR) execution cycles
9500 clock cycles or
$10^4 \times 10^{-7}$ sec/instruction
Interrupt service time for each interrupt (assuming the waveform in FIG. 4 applies)
8 clock cycles or
$8 \times 10^{-7}$ sec/interrupt
Max desirable FT for real-time simulation having frequencies up to 20 Hz.
$5 \times 10^{-3}$ sec/FT
Number of typical instructions/FT $$\frac{5 \times 10^{-3} \text{ sec/FT}}{2 \times 10^{-5} \text{ sec/instr}} = 250 \text{ instr/FT}$$

Number of worst case instructions/FT $$\frac{5 \times 10^{-3} \text{ sec/FT}}{10^{-3} \text{ sec/instr}} = 5 \text{ instr/FT}$$

NOTE:
This is seldom used & might even be dropped from instruction set.
Max time used by interrupt/FT (assuming FIG. 4 applies)
250 int/FT $\times$ 8 $\times$ $10^{-7}$ sec/interrupt = 2.0 $\times$ $10^{-4}$ sec/FT or $$\frac{2.0 \times 10^{-4}}{5 \times 10^{-3}} \times 100 = 4.0\% \text{ of FT}$$

TABLE 6-continued

Integrator update time
$10^3$ cycles/integration × $10^{-7}$ sec/cycle = $10^{-4}$ sec.

From the calculations presented in Table 6, it is clear that all the constraints can be satisfied without undue difficulty if moderate care is exercised in the distribution of non-integrator ECs between successive integrator ECs. This is the providence of the programmer, but may, as previously noted, be checked by the MC during compilation.

To further expand upon the illustrative example of this embodiment, though with lesser complexity, consider the simulation undertaken to be that of a point mass missile attempting to hit a point mass target, where the target is traveling at a constant velocity and turn rate. For purposes of this limited example, motion is constrained to the horizontal plane with proportional navigation as the guidance law. This example demonstrates the PDC programs, the sequence of events necessary to solve the problem, and a direct comparison of EC and analog computer elements. The symbols, the parameters they represent, and the corresponding units used in the example are defined in Table 7.

TABLE 7

| Equation Symbols | Computer Program Symbols | Parameter Represented | Units |
|---|---|---|---|
| R | R | range, missile to target | feet |
| λ | LAMB | line to sight angle to X reference | degrees |
| $\gamma_m$ | GAMM | angle of missile velocity to X reference | degrees |
| $\gamma_t$ | GAMT | angle of target velocity to X reference | degrees |
| $V_m$ | VM | missile velocity | ft/sec |
| $V_t$ | VT | target velocity | ft/sec |
| $X_m$ | XM | position of missile on X axis | feet |
| $Y_m$ | YM | position of missile on Y axis | feet |
| $X_t$ | XT | position of target on X axis | feet |
| $Y_t$ | YT | position of target on Y axis | feet |
| t | | time | seconds |
| K | K | gain constant for steering | |
| o | | subscript representing initial value | |
| | O | suffix representing initial value | |
| | FT | frame time | seconds |
| | RT1 | RTC interval to MC | |
| | RT2 | RTC interval to non-integrator ECs | |

Table 8 contains the analytical equations defining the example simulation. Since the equations are well known to those performing simulations in the aerospace field, and are extensively described in publications, their origins will not be described.

TABLE 8

$\dot{R} = V_t\cos(\lambda - \gamma_t) - V_m\cos(\lambda - \gamma_m)$ $R = \int_o^t \dot{R}\, dt + R_o$ $\dot{\lambda} = [-V_t\sin(\lambda - \gamma_t) + V_m\sin(\lambda - \gamma_m)]1/R$ $\lambda = \int_o^t \dot{\lambda}\, dt + \lambda_o$ $\dot{\gamma}_m = \dot{K}\lambda$

Figure 5:
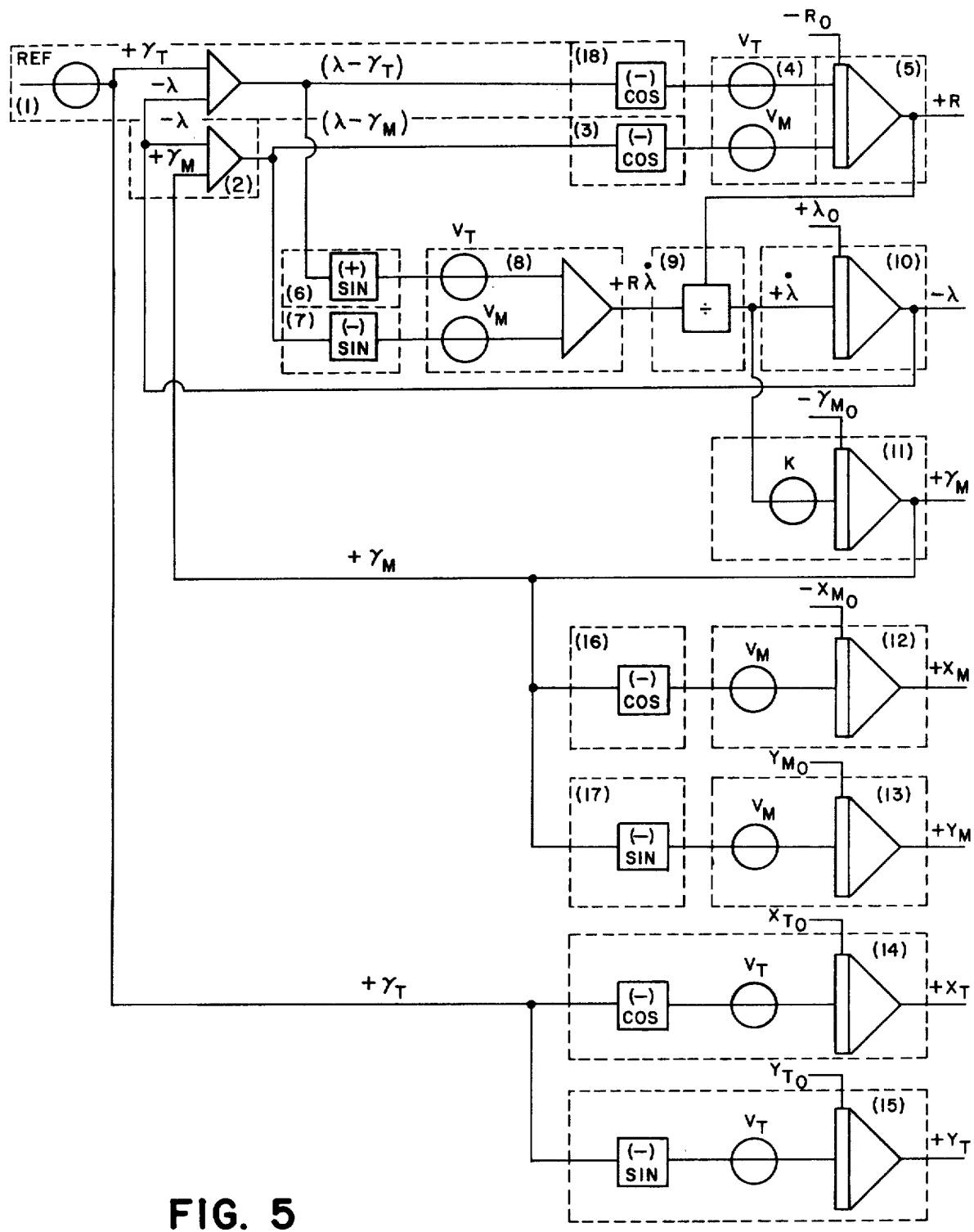
FIG. 5 is a schematic of an analog simulation upon which is superimposed its parallel digital computer (PDC) counterpart structure.

TABLE 8-continued $\gamma_m = \int_o^t \dot{\gamma}_m\, dt + \gamma_{mo}$ $\dot{X}_m = V_m \cos \lambda_m$
$\dot{Y}_m = V_m \sin \lambda_m$ $X_m = \int_o^t \dot{X}_m\, dt + X_{mo}$ $Y_m = \int_o^t \dot{Y}_m\, dt + Y_{mo}$ $\dot{X} = V_t \cos \gamma_t$
$\dot{Y}_t = V_t \sin \gamma_t$ $X_t = \int_o^t \dot{X}_t\, dt + X_{to}$ $Y_t = \int_o^t \dot{Y}_t\, dt + Y_{to}$ FIG. 5 is a schematic diagram of an analog simulation corresponding to the set of equations in Table 8. As shown, the analog diagram has been simplified to the extent that no scaling is done and sin/cos generators are assumed capable of processing either positive or negative inputs. Also appearing in FIG. 5 are overlaid blocks, defined by dashed lines, enclosing the various analog system functional elements. Each block represents an EC performing the functions enclosed. Again, since the simulation is comparatively simple and well known by those practicing in the art, FIG. 5 merits no further elaboration.

Figure 6:
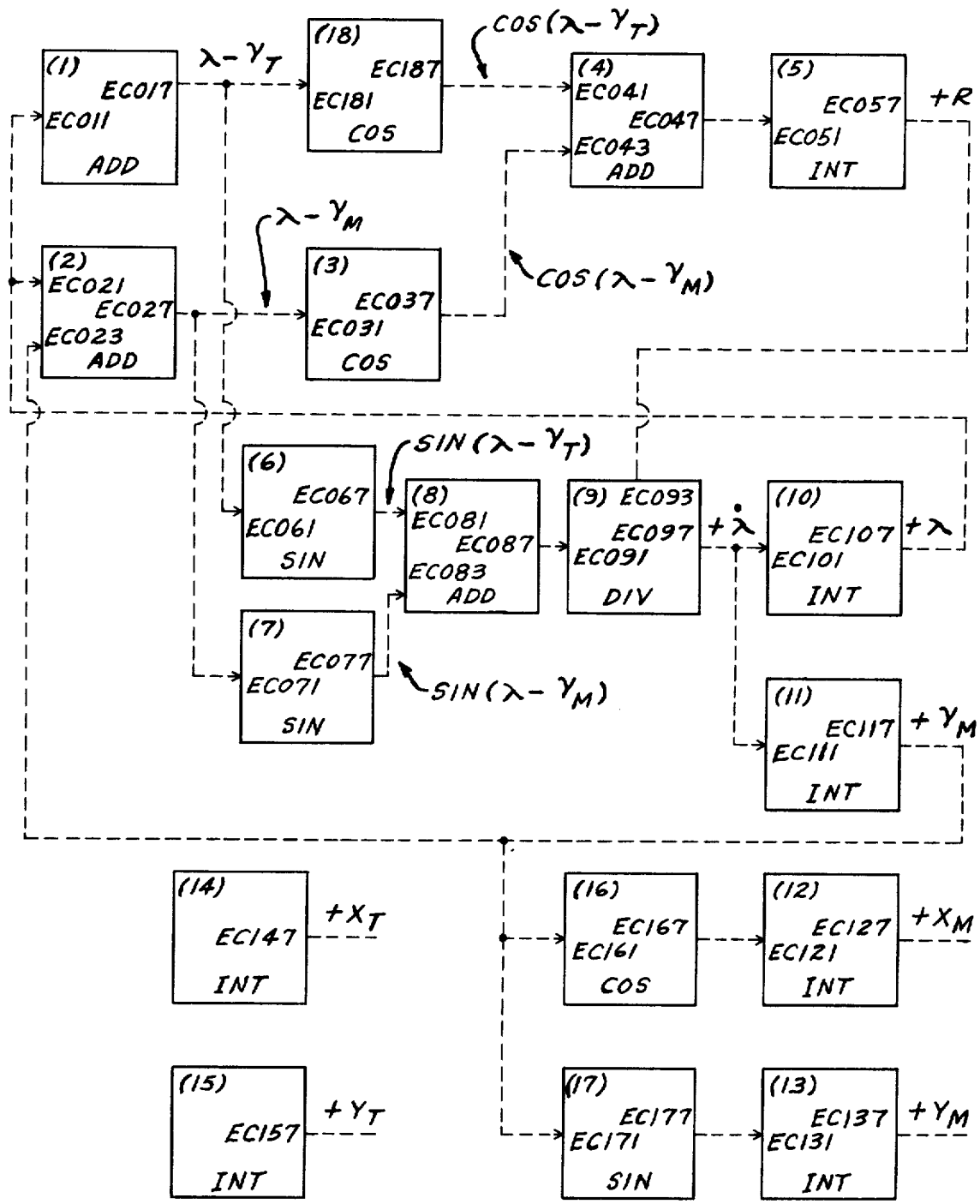
FIG. 6 is a schematic program diagram of the PDC for the simulation of FIG. 5.

FIG. 6 is the same simulation diagrammatically presented in PDC block diagram structure. The blocks represent individual ECs while the dashed interconnecting lines define the MC transfer program, i.e., the flow of data between ECs under the control of the MC. For purposes of comparison, the blocks in FIGS. 5 and 6 are correspondingly numbered in parenthesis. To relate the ECs to the computer program described hereinafter, the MC addresses for the registers follow a format of EC nni. The nn represents a two digit sequential EC number and i represents a MC/EC register associated with EC nn. The registers conform to those appearing in FIG. 2, reference numerals 21, 24 and 26, with those having seven registers numbered 1 through 7 proceeding downward.

A full PDC program for the example simulation is provided in Table 9. The numerical values selected are considered to be nominal. Since the equations, symbols, and interconnected block diagrams have been introduced, the program itself is substantially self-explanatory with minor exceptions. The program under SETUP is inserted when the PDC is in that mode. The RESET program is entered during its corresponding mode, though entry would likely be directly from internal MC storage programmed prior to initiating RESET.

TABLE 9

| SETUP PROGRAM | RESET PROGRAM | RUN PROGRAM |
|---|---|---|
| GAMT = 3.1416/2. | EC016 = ADD | EC011 = EC107 |
| RO = 10000. | EC026 = ADD | EC021 = EC107 |
| LAMBO = 0. | EC036 = COS | EC023 = EC117 |
| GAMMO = 0. | EC046 = ADD | EC031 = EC027 |

TABLE 9-continued

| SETUP PROGRAM | RESET PROGRAM | RUN PROGRAM |
|---|---|---|
| XMO = 0. | EC066 = SIN | EC041 = EC187 |
| YMO = 0. | EC076 = SIN | EC043 = EC037 |
| XTO = 10000. | EC086 = ADD | EC051 = EC047 |
| YTO = 0. | EC096 = DIV | EC061 = EC017 |
| FT = .001 | EC166 = COS | EC071 = EC027 |
| RT1 = .0001 | EC176 = SIN | EC081 = EC067 |
| RT2 = .0001 | EC186 = COS | EC083 = EC077 |
| VM = 900. | EC012 = 1.0 | EC091 = EC087 |
| VT = 700. | EC013 = −GAMT | EC093 = EC057 |
| K = 4 | EC014 = 1.0 | EC101 = EC097 |
| END | EC022 = 1.0 | EC111 = EC097 |
| | EC024 = −1.0 | EC121 = EC167 |
| | EC032 = 1.0 | EC131 = EC177 |
| | EC033 = 0. | EC161 = EC117 |
| | EC042 = +VT | EC171 = EC117 |
| | EC044 = −VM | EC181 = EC017 |
| | EC053 = FT | END |
| | EC054 = FT/2. | |
| | EC055 = 1.0 | |
| | EC056 = RO | |
| | EC057 = RO | |
| | EC062 = 1.0 | |
| | EC063 = 0. | |
| | EC072 = 1.0 | |
| | EC073 = 0. | |
| | EC082 = −VT | |
| | EC084 = VM | |
| | EC092 = 1.0 | |
| | EC094 = 1.0 | |
| | EC103 = FT | |
| | EC014 = FT/2. | |
| | EC105 = 1.0 | |
| | EC106 = LAMBO | |
| | EC107 = LAMBO | |
| | EC113 = FT | |
| | EC114 = FT/2. | |
| | EC115 = 1.0 | |
| | EC116 = GAMMO | |
| | EC117 = GAMMO | |
| | EC123 = FT | |
| | EC124 = FT/2. | |
| | EC125 = 1.0 | |
| | EC126 = XMO | |
| | EC127 = XMO | |
| | EC133 = FT | |
| | EC134 = FT/2. | |
| | EC135 = 1.0 | |
| | EC136 = YMO | |
| | EC137 = YMO | |
| | EC141 = VT*COS(TAMT) | |
| | EC143 = FT | |
| | EC144 = FT/2. | |
| | EC145 = 1.0 | |
| | EC146 = XTO | |
| | EC147 = XTO | |
| | EC151 = VT*SIN(GAMT) | |
| | EC153 = FT | |
| | EC154 = FT/2. | |
| | EC155 = 1.0 | |
| | EC156 = YTO | |
| | EC157 = YTO | |
| | EC162 = 1.0 | |
| | EC163 = 0. | |
| | EC172 = 1.0 | |
| | EC173 = 0. | |
| | EC182 = 1.0 | |
| | EC183 = 0. | |
| | END | |

One skilled in the art clearly recognizes the plethora of attributes distinguishing the PDC architecture disclosed herein from the conventional analog computer. As to physical characteristics, the conventional patchcord interconnect system and the high maintenance costs of the analog version have been eliminated. Good accuracy and full repeatability are attained from the digital format and its resolution, while simultaneously eliminating the scaling of variables burden present in analog systems. As with all digital systems, programming flexibility and large data storage capability are inherent characteristics. Direct interface with analog hardware is not sacrificed since A/D and D/A conversion devices are readily available. And finally, present estimates place the purchase cost in the range of half that of an analog system while having the capability to support over 90% of the typical simulations undertaken on the comparable system.

I claim:

1. A digital data processing apparatus for executing real-time analog format functions comprising:

(a) a plurality of elemental computers, each of which is a complete digital data processor having its own central processing unit, memory, input/output means, cycle clock, external interrupt capacity, and stored program;

(b) a master controller with a master cycle clock and an external interrupt capacity for regulating the transfer of data between elemental computers in conformity to an ordered sequence;

(c) an MC memory;

(d) master bus means comprising a data bus and an address bus, both coupled to the master controller, to the MC memory, and to the input/output means of the elemental computers;

(e) a real-time clock operating at a rate commensurate with the upper frequencies of a simulation but at a substantially lower frequency than said cycle clocks, an MC interrupt line coupling said real-time clock to the master controller, and two MC interrupt lines which are an integrator interrupt line and a non-integrator interrupt line, with each elemental computer coupled to said real-time clock via at least one of said two EC interrupt lines; wherein said real-time clock generates timing comprising repetitive frames with alternating EC time slots and MC time slots in each frame, the EC time slots being divided into a plurality of non-integration time slots and one integration time slot each frame, the number of EC time slots per frame being determined by the maximum number of interchanges of data required by the program for non-integrating functions between integrating functions;

(f) wherein for any given simulation program some of the elemental computers are assigned non-integrating functions and are enabled via said non-integrator interrupt line during non-integration time slots, and other of the elemental computers are assigned integrating functions and are enabled via said integration interrupt line during integration time slots, each said function corresponding to the function of one computing element of an analog computer, each elemental computer making one pass of its program to perform its assigned function digitally upon receiving an interrupt signal;

(g) the master controller being enabled via said MC interrupt line during MC time slots to transfer data via said master bus means among the elemental computers, so as to be means functionally equivalent to patchcord interconnections of computing elements of an analog computer; and (h) wherein said input/output means comprises registers addressable from either the master controller via said master bus means or from the respective elemental computers.

2. The apparatus as recited in claim 1 wherein said master controller is a general purpose scientific digital minicomputer having its individual identifiable master central processor, master input/output means, internal interrupt capacity, and memory elements included in said MC memory, differing in one respect in that a portion of the memory addresses are reserved for communication with said elemental computers, wherein at least some of the elemental computers contain internal thereto a library of processing functions selectable by the master controller via a command register forming part of said input/output means, and wherein said master bus means is the only connection of each elemental computer to the master controller and to other elemental computers for data and instruction transfer, the transfer being only to, from or via the master controller.

3. The apparatus as recited in claim 2, wherein the master controller is able to run general purpose digital programs and also has the capacity to compile software as an adjunct to its control functions.

4. The apparatus as recited in claim 2, wherein there is means for providing that operation is divided into three fairly distinct phases designated respectively as a setup mode, a reset mode, and a run mode; a manual control analogous to the operator panel of an analog computer for selection of the mode and controlling insertion of data;

the setup mode being means operative for program loading to allocate the elemental computers, designate their operating commands, and generate the program for controlling the master controller during the run mode, said real-time clock being stopped during this mode;

the reset mode being means operative for setup and initialization, comprising selecting and setting starting values for the program variables, inserting data for table lookups, and selecting frame parameters for said real-time clock, the real-time clock being stopped during this mode;

the run mode being means operative with said real-time clock running to run the non-integrator elemental computers simultaneously during EC time slots, the master controller data transfer program during MC time slots, and during the integration time slot to update in parallel all integrator elementary computers;

with interrupt means capability wherein either the setup or the reset mode has priority to interrupt the run mode, and the interrupt system does not cause execution of the remaining program at a later time; and the setup mode has priority to interrupt the reset mode.

5. The apparatus as recited in claim 4, further including a hold mode which is means operative to interrupt the run mode so that the program will accept address selections to monitor the elemental computer outputs, the hold mode being interruptable by either the reset or the setup mode.

6. The apparatus as recited in claims 1, 2, 3, 4 or 5 wherein said input/output means of some of the elemental computers includes four input registers A, B, C, D, wherein registers B and D are used to store constants which remain fixed in value as long as the real-time clock is running, with the elemental computer functioning to multiply the contents of registers A and B and also of C and D to form two inputs for the principal function that elemental computer is programmed to perform, to thereby greatly reduce the number of elemental computers required.

7. The apparatus as recited in claim 6, where said input/output means for integration elemental computers includes registers for old and new values of dependent and independent variables, one register for a coefficient and at least one register for a frame timing parameter.

8. The apparatus as recited in claim 7, wherein the input/output means of some of the elemental computers include a large number of registers for storing values of a function of one variable.

9. The apparatus as recited in claim 8, wherein the input/output means of at least some of the elemental computers includes external input/output means independent of said bus means, so that the elemental computer output may appear continuously to a user, inluding digital-to-analog conversion for some of the outputs, and analog-to-digital conversion for some of the inputs.

10. The apparatus as recited in claims 1, 2 or 4 wherein the input/output means of at least some of the elemental computers includes external data transfer means independent of said master bus means.

11. The apparatus as recited in claim 10, further including analog-to-digital conversion means associated with said external data transfer means to permit direct input of data to some of the elemental computers.

12. The apparatus as recited in claim 11, further including digital-to-analog converter means associated with said external data transfer means to permit direct attachment of actual hardware during simulation.

* * * * *